(12) United States Patent
Berger

(10) Patent No.: US 11,519,351 B2
(45) Date of Patent: Dec. 6, 2022

(54) METHOD FOR OPERATING AN INTERNAL COMBUSTION ENGINE HAVING AN EXHAUST-GAS CATALYTIC CONVERTER

(71) Applicant: Robert Bosch GmbH, Stuttgart (DE)

(72) Inventor: Alex Berger, Tamm (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/706,947

(22) Filed: Mar. 29, 2022

(65) Prior Publication Data

US 2022/0307438 A1 Sep. 29, 2022

(30) Foreign Application Priority Data

Mar. 29, 2021 (DE) .......................... 102021203099.8

(51) Int. Cl.
| | | |
|---|---|---|
| *F02D 41/12* | (2006.01) | |
| *F02D 41/02* | (2006.01) | |
| *F02D 41/14* | (2006.01) | |
| *F02D 41/00* | (2006.01) | |

(52) U.S. Cl.
CPC ....... *F02D 41/027* (2013.01); *F02D 41/0087* (2013.01); *F02D 41/0295* (2013.01); *F02D 41/126* (2013.01); *F02D 41/1454* (2013.01); *F02D 41/1475* (2013.01)

(58) Field of Classification Search
CPC ... F02D 41/027; F02D 41/0295; F02D 41/126
USPC ............................. 60/285, 303; 123/325, 326
See application file for complete search history.

(56) References Cited

U.S. PATENT DOCUMENTS

| | | | | |
|---|---|---|---|---|
| 2003/0159434 A1* | 8/2003 | Ikemoto | .............. | F02D 41/0235 60/285 |
| 2005/0262831 A1* | 12/2005 | Shouda | ................. | F02D 41/126 60/285 |
| 2006/0005533 A1* | 1/2006 | Takubo | ............... | F02D 41/1441 60/285 |

(Continued)

FOREIGN PATENT DOCUMENTS

| | | |
|---|---|---|
| DE | 4236922 A1 | 5/1994 |
| DE | 19858468 A1 | 8/1999 |

(Continued)

*Primary Examiner* — Erick R Solis
(74) *Attorney, Agent, or Firm* — Michael Best & Friedrich LLP

(57) ABSTRACT

Operating an internal combustion engine (110) having at least two combustion chambers (1-6) and at least one exhaust-gas catalytic converter (130). In one example, a beginning of the load operation phase of the internal combustion engine (110) that adjoins a coasting phase is detected. A combustion chamber of the at least two combustion chambers (1-6) is determined as the first combustion chamber; and one of other the combustion chambers is selected as the purging combustion chamber. An exhaust gas of the purging combustion chamber is directed into the same exhaust-gas catalytic converter (130) as an exhaust gas of the first combustion chamber. A first fuel quantity is fed into the purging combustion chamber such that the first fuel quantity, prior to igniting the fuel in the purging combustion chamber, is discharged to be partially or fully non-combusted in the direction of the exhaust-gas catalytic convertor (130).

9 Claims, 1 Drawing Sheet

(56) References Cited

U.S. PATENT DOCUMENTS

| | | | |
|---|---|---|---|
| 2007/0062489 A1* | 3/2007 | Miyata | F01N 3/0814 |
| | | | 123/406.47 |
| 2008/0097680 A1* | 4/2008 | Yoshioka | F02D 41/126 |
| | | | 60/285 |
| 2014/0216013 A1* | 8/2014 | Osaki | F01N 3/20 |
| | | | 60/285 |

FOREIGN PATENT DOCUMENTS

| | | |
|---|---|---|
| DE | 19963929 A1 | 7/2001 |
| DE | 102004019831 A1 | 11/2005 |

* cited by examiner

METHOD FOR OPERATING AN INTERNAL COMBUSTION ENGINE HAVING AN EXHAUST-GAS CATALYTIC CONVERTER

BACKGROUND OF THE INVENTION

The present invention relates to a method for operating an internal combustion engine, and to a computer unit, and to a computer program for carrying out said method.

In order to keep emissions as low as possible in four-stroke engines, a so-called three-way catalytic converter, or else a so-called four-way catalytic converter (thus a three-way catalytic converter having an integrated particle filter), can be used. In order for the catalytic converter to be able to develop its full output potential, said catalytic converter has to be operated in a defined range, the so-called catalytic converter window. Three-way catalytic converters are typically capable of storing exhaust gas components, in particular oxygen. During coasting phases, in which the internal combustion engine does not deliver a driving torque, a fuel injection system can be deactivated and the internal combustion engine can consequently pump ambient air through the exhaust gas system. Oxygen is stored in the catalytic converter in the process. In the event of a subsequent load requirement, this stored oxygen has to be removed from the catalytic converter again so that the catalytic converter is brought back to the catalytic converter window, thus can convert the exhaust gases again. This is also referred to as "catalyst purging".

SUMMARY OF THE INVENTION

Proposed according to the invention are a method for operating an internal combustion engine, as well as a computer unit and a computer program for carrying out said method.

The invention utilizes the measure of performing purging of a catalytic converter by non-combusted fuel ideally immediately prior to the beginning of a load operation phase following a coasting phase. To this end, a combustion chamber is used, which hereunder is also referred to as the purging combustion chamber and which is not the combustion chamber that is the first to ignite again after the end of the coasting phase.

A method according to the invention for operating an internal combustion engine having at least two combustion chambers and one exhaust-gas catalytic converter comprises in detail detecting a beginning of a load operation phase of the internal combustion engine that adjoins a coasting phase, wherein the internal combustion engine is not fed any fuel during the coasting phase, and fuel is fed during the load operation phase;

determining that combustion chamber of the at least two combustion chambers of the internal combustion engine in which an ignition of the fed fuel first takes place at the beginning of the load operation phase, as the first combustion chamber;

selecting one of the combustion chambers of the at least two combustion chambers that is not determined as the first combustion chamber as the purging combustion chamber, wherein an exhaust gas of the purging combustion chamber is directed into the same exhaust-gas catalytic converter as an exhaust gas of the first combustion chamber; and feeding a first fuel quantity into the purging combustion chamber such that the first fuel quantity, prior to igniting the fuel in the purging combustion chamber, is expelled so as to be at least partially—preferably fully—non-combusted in the direction of the exhaust-gas catalytic converter.

As a result, the exhaust-gas catalytic converter can be brought back to the catalytic converter window without requiring an intense enrichment of the mixture during combustion. As a result, the internal combustion engine can be subjected to less wear and tear, and the exhaust emissions can be reduced. The best result is achieved during completely non-combusted expelling.

It is to be emphasized here that the combustion chamber selected as the purging combustion chamber is to be assigned to the same exhaust-gas post-treatment system as the first combustion chamber, in particular in the case of separate exhaust-gas post-treatment systems for groups of combustion chambers which comprise in each case a dedicated catalytic converter. In such cases, it is particularly advantageous when one assigned first combustion chamber and one assigned purging combustion chamber are in each case determined for each of the exhaust-gas post-treatment systems. When a first combustion chamber is thus mentioned in the explanations hereunder, this relates in each case to the first combustion chamber of such a group of combustion chambers that are assigned to a common exhaust-gas post-treatment system. The same applies in an analogous manner for other combustion chambers in the respective firing order being considered.

In general, purging of a catalytic converter can also be achieved by an intensely superstoichiometric mixture ($\lambda<0.85\ldots0.9$) at the beginning of the load operation phase, also referred to as the mixture enrichment already mentioned. The rich mixture is required for purging the catalytic converter, thus for converting the oxygen stored therein, on the one hand, and for reducing the $NO_x$ engine-out emissions, on the other hand. The reduction of the $NO_x$ engine-out emissions is necessary because the latter cannot be converted by a catalytic converter filled with oxygen. However, the rich mixture can lead to CO, HC and particle emissions. As a result of the present invention, the enrichment of the mixture can be dispensed with, or take place in a significantly less pronounced manner, respectively, as a result of which the disadvantages just discussed are avoided.

The feeding of the predeterminable fuel quantity into the purging combustion chamber is preferably carried out in a discharging or expelling stroke of the purging combustion chamber, in particular when this is a direct-injection system, but in specific design embodiments may also take place in all other strokes of an operating cycle of the purging combustion chamber. A dwell time of the fuel used for purging the catalytic converter in the purging combustion chamber is minimized by feeding fuel in the expelling stroke so that the fuel can be expelled ideally completely and without chemical modification into the catalytic converter. Optionally, feeding during the other strokes may however also be advantageous in specific operating situations, for example so as to specifically cause a chemical modification, which in the catalytic converter may have an advantageous effect on the reaction kinetics of the purging of the catalytic converter. For example, a partially oxidized fuel may require less activation energy for the reaction with the oxygen stored in the catalytic converter, so that the reaction can take place more rapidly, in particular in the case of a cold catalytic converter. However, an ideally short dwell duration in the respective purging combustion chamber will be preferable in most of the operating states.

The first fuel quantity is advantageously chosen such that the mixture expelled from the internal combustion engine is composed so as to be substoichiometric to superstoichiometric. As a result, the catalytic convertor can be purged to the extent that non-converted exhaust gas does not make its way through the catalytic converter.

Alternatively or additionally thereto, the first fuel quantity can be determined as a function of a duration of the preceding coasting phase, because the quantity stored in the catalytic converter increases as the duration increases. In particular, a maximum storage capability of the catalytic convertor can also be taken into account here such that no further increase in the fuel quantity is effected beyond a duration of the coasting phase that corresponds to the maximum storage capability. The additionally fed fuel in terms of the precise quantity can thus be adjusted to the actual requirement necessary for purging.

The purging combustion chamber is in particular selected such that the non-combusted fuel makes its way into the exhaust-gas catalytic converter before an exhaust gas of the fuel ignited in the first combustion chamber. Depending on the specific design embodiment of the internal combustion engine, it can be advantageous for the combustion chamber, which in the firing order directly follows the first combustion chamber, or at an interval follows a specific number of intermediate combustion chambers, to be selected as the purging combustion chamber, for example. The choice of the purging combustion chamber can depend on, for example, the number of combustion chambers which the internal combustion engine has, the mutual arrangement of said combustion chambers (both in temporal terms, in particular in terms of an ignition timing, and in spatial terms) and/or a current operating parameter of the internal combustion engine. Optionally, corresponding simultaneous or successive feeding of the fuel quantity into a plurality of purging combustion chambers may also be advantageous.

The purging combustion chamber is in particular chosen such that said combustion chamber is that combustion chamber that in the first firing order immediately after the beginning of the load operation phase is ignited as the last.

Additionally, the method can furthermore comprise generating an exhaust gas in the first combustion chamber at the beginning of the load operation phase, said exhaust gas having a lambda value in the superstoichiometric range or in the stoichiometric range (for example between 0.90 and 1, in particular between 0.94 and 0.97). As a result, the purging of the catalytic converter is facilitated without causing any significantly increased exhaust emissions.

A computer unit according to the invention, for example a control apparatus of a motor vehicle, in particular in terms of programming technology, is specified for carrying out a method according to the invention.

The implementation of a method according to the invention in the form of a computer program or a computer program product having a program code for carrying out all method steps is also advantageous, because this causes particularly minor costs, in particular when a control apparatus executing said program is also utilized for further tasks and is therefore present anyway. Suitable data carriers for providing the computer program are, in particular, magnetic, optical and electrical memories such as, for example, hard disks, flash memories, EEPROMs, DVDs, and many more. Downloading a program by way of a computer network (internet, intranet, etc.) is also possible.

BRIEF DESCRIPTION OF THE DRAWINGS

Further advantages and design embodiments of the invention are derived from the description and the appended drawing.

The invention is schematically illustrated by means of an exemplary embodiment in the drawing, and is described hereunder with reference to the drawing.

DETAILED DESCRIPTION

Figure 1:
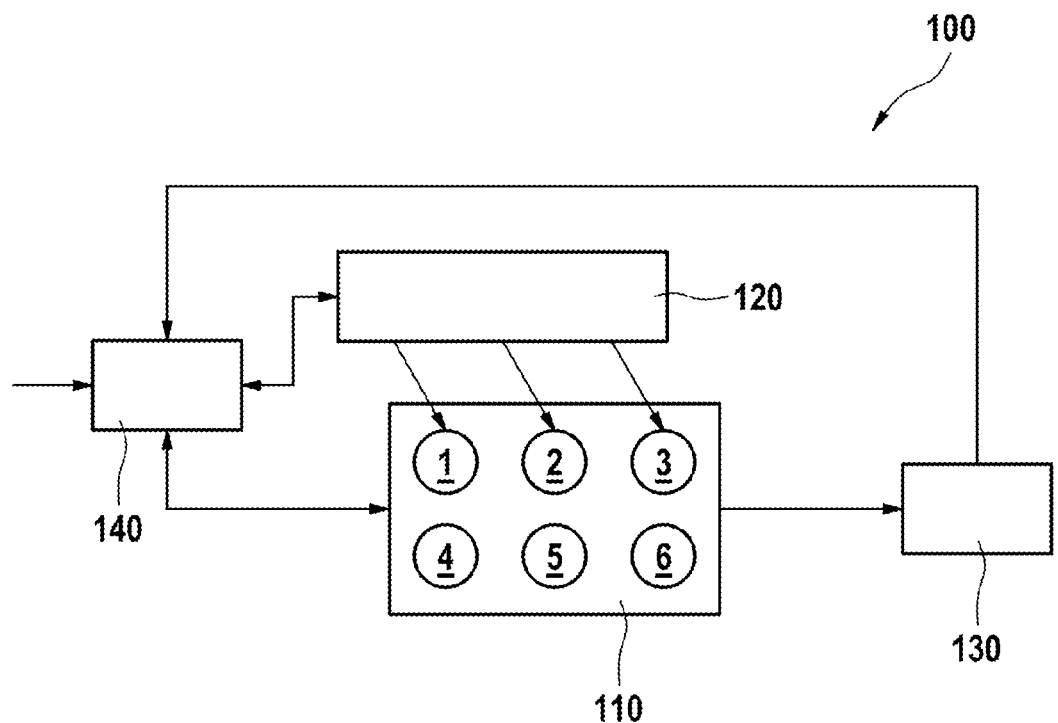
FIG. 1 shows an assembly having an internal combustion engine for carrying out an advantageous design embodiment of a method according to the invention in the form of a schematic block diagram.

Schematically illustrated in the form of a block diagram in FIG. 1 and overall identified by the reference sign 100 is an assembly having an internal combustion engine 110 which can be used for carrying out an advantageous design embodiment of a method according to the invention.

Besides the internal combustion engine 110 which can be designed, for example, as a four-stroke reciprocating-piston gasoline engine, diesel engine, or as a rotary-piston engine, the assembly 100 comprises an injection system 120, an exhaust-gas catalytic converter 130, and a computer unit 140 (so-called engine control unit, ECU).

The internal combustion engine 110 comprises a plurality of combustion chambers, wherein six combustion chambers 1-6 are present in the example illustrated and correspondingly explained here. Each of the combustion chambers 1-6 during the operation of the internal combustion engine is supplied with fuel by the injection system 120. This is a direct injection system, but the invention is likewise suitable for intake-manifold injection systems. The computer unit 140 monitors and controls the operation of the assembly 100 and receives control signals from outside the assembly 100, for example by way of an operating unit such as a pedal, a switch, or the like. For example, the computer unit, as a function of a received control signal, can be specified for initiating the injection system to feed fuel into each combustion chamber 1-6 or specific ones of the latter, to adjust ignition timings for the combustion chambers 1-6 of the internal combustion engine, to receive signals from components of the assembly 100, and/or to determine operating parameters of the internal combustion engine 110, of the injection system 120 and/or of the exhaust-gas catalytic converter 130.

The injection system 120 in turn, as a function of control signals which the latter receives from the computer unit 140, is specified for feeding to each one of the combustion chambers 1-6 fuel in a quantity defined by the control signals and at a defined point in time. In principle, this can take place in any arbitrary manner which is suitable for feeding in such a defined manner. For example, a fuel pump can impinge with fuel at a specific pressure one or a plurality of distributors (rails) which supply in each case a plurality of the combustion chambers 1-6, wherein the pressure can be predetermined or controlled by open-loop or closed-loop, respectively. The quantity and the timing of the respective feeding can then be controlled by way of controlled individual injection valves of the combustion chambers. A further example would be an injection assembly assigned in each case to only one combustion chamber, for example in the form of a conventional pump/nozzle combination or an individual injection pump of each combustion chamber. This enumeration explicitly represents only exemplary embodiments and does not claim to be exhaustive.

The exhaust-gas catalytic converter 130 is specified for bringing exhaust-gas components that are generated in the operation of the internal combustion engine 110 to react with one another, so as to convert harmful emissions to less harmful compounds. For example, the exhaust-gas catalytic converter 130 can be provided as a conventional three-way or four-way catalytic converter. An oxidation catalytic converter and/or a SCR catalytic converter can also be used as the exhaust-gas catalytic converter 130 in particular in cases in which the internal combustion engine 110 is designed as a diesel engine. For the purpose of explanation, the use of a three-way or four-way catalytic converter is assumed hereunder.

As has been mentioned at the outset, the exhaust-gas catalytic converter 130 is particularly effective in a defined catalytic converter window, wherein the catalytic converter window describes a range of exhaust-gas compositions. Oxygen, rich gas components and carbon monoxide as component parts are of particular importance here. Therefore, the operation of the internal combustion engine 110 in the normal operation is controlled by an open loop or a closed loop, respectively, such that said internal combustion engine 110 generates an exhaust gas with a composition which corresponds to an air-fuel ratio of 1. However, when the internal combustion engine 110 is operated in a so-called coasting operation, thus that said internal combustion engine 110 exerts a decelerating moment on a downstream drivetrain, in particular on a clutch input shaft and/or a travel gear, the rich gas components and carbon monoxide typically are absent in the exhaust gas because little fuel or no fuel at all is injected into the combustion chambers 1-6 of the internal combustion engine 110. This lowers the fuel consumption and also the corresponding exhaust-gas emissions in such an operating phase, but subsequently has a negative effect on the conversion capability of the exhaust-gas catalytic converter 130 because the latter in this instance has stored too much oxygen. Conventionally, therefore, at the end of a coasting phase of this type a rich air/fuel mixture can be injected into the combustion chambers 1-6 of the internal combustion engine 110 so as to generate a rich exhaust gas. The exhaust-gas catalytic converter 130 can thus be brought back to the catalytic converter window in a relatively rapid manner. This represents a conventional measure for rapidly reinstating the operation of the catalytic converter after a coasting phase.

In the assembly 100 shown, all combustion chambers 1-6 are assigned to a single catalytic converter 130. However, as has already been explained at the outset, the invention can also be utilized in assemblies in which a plurality of groups of combustion chambers are in each case assigned to a separate catalytic converter 130. For example, the combustion chambers 1-3 in the design embodiment of the internal combustion engine 110 shown can be unified in a first group and assigned to a first catalytic converter 130, wherein the combustion chambers 4-6 as a second group can be assigned to a second catalytic converter 130. Depending on the design embodiment of the internal combustion engine 110, more than two catalytic converters 130 can also be provided in parallel. In terms of the invention it is essential here that each catalytic converter is assigned at least two of the combustion chambers 1, 2, 3, 4, 5, 6.

Figure 2:
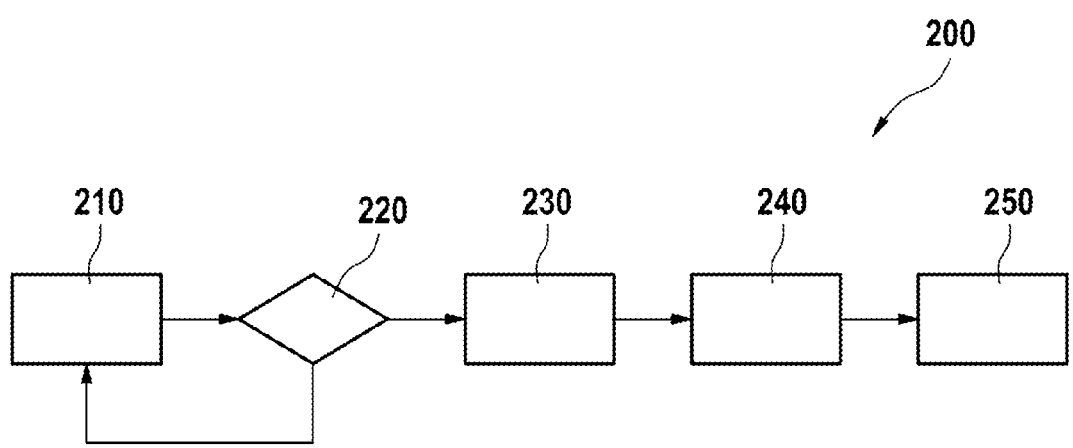
FIG. 2 shows an advantageous design embodiment of a method according to the invention in a simplified illustration in the form of a flow chart.

An advantageous design embodiment of a method according to the invention is identified overall by the reference sign 200 and illustrated in the form of a simplified flow chart in FIG. 2. References, in particular to components of the device, in the description of FIG. 2 may also relate to reference signs in FIG. 1.

In a first step 210 of the method 200, an operating mode of the internal combustion engine 110 is detected. To this end, a position of the pedal, in particular of a driving pedal, or any other load requirement signal can be evaluated, for example. An evaluation of a torque currently provided by the internal combustion engine 110 can also be utilized to this end, for example.

In a step 220 it is determined whether the operating state determined in step 210 changes from a coasting operation to a load operation. Should this not be the case, the method 200 reverts to detecting the operating state of the internal combustion engine 110, thus to step 210.

However, if it is established in step 220 that the internal combustion engine is situated at the beginning of a load operation phase that follows a coasting phase, the method 200 continues with a step 230 in which it is determined which of the combustion chambers 1-6 as the first combustion chamber is to be first ignited. To this end, a signal of an angle sensor on a crankshaft of the internal combustion engine 110 can be used, for example. In step 230, the timing of this first ignition of the first combustion chamber is preferably also determined.

In a step 240, another one of the combustion chambers 1-6 is selected as the purging combustion chamber, the latter to be fed fuel which is to be expelled from the selected combustion chamber so as not to be combusted, i.e. without igniting the corresponding combustion chamber after the fuel has been fed. The selection here comprises, in particular, determining from which of the combustion chambers, which are not the first combustion chamber, fuel expelled so as not to be combusted can make its way into the exhaust-gas catalytic converter 130 before the exhaust gas generated by igniting the first combustion chamber. In particular, the combustion chamber which after the beginning of the load operation phase is ignited last (and is thus also last to be impinged with fuel in the regular operation) can be selected here. The most favorable timing of such feeding of fuel for purging the exhaust-gas catalytic converter 130 can also be determined in step 240. Such feeding is in each case particularly advantageous during an expelling stroke of the selected combustion chamber, because the fuel in this instance has only a very short dwell time in the respective combustion chamber and is, therefore, expelled so as to be largely chemically unmodified. Partial condensation of the fuel on a wall of the combustion chamber can also be minimized or avoided, respectively, as a result of a short dwell time. However, as has already been explained, feeding at another timing can optionally also be advantageous, for example so as to promote chemical modifications of the fuel in a targeted manner. It can also be provided that in step 240 a plurality of combustion chambers for feeding fuel for the purpose of purging the catalytic converter are selected, for example so as to achieve a wider temporal distribution and thus optionally an increased efficiency. It is once again to be explicitly pointed out here that, in the case of a plurality of groups of combustion chambers which are in each case assigned to a separate catalytic converter 130, the first combustion chamber and the purging combustion chamber have to be assigned to the same catalytic converter so as to be able to implement the success to be achieved by the invention. In particular, the method 200 is separately carried out for each of the groups of combustion chambers, or for each catalytic converter 130, respectively, in such cases.

When the combustion chamber (and the timing) for the feeding of the fuel have been selected, the explained measures are correspondingly carried out in a step 250. Accordingly, a defined quantity of fuel is fed into the selected combustion chamber or chambers, respectively, at a defined point in time and expelled without ignition in the direction of the exhaust-gas catalytic converter 130. To this end, the injection system 120 opens, for example, a corresponding injection valve of the selected purging combustion chamber or chambers, respectively, over a correspondingly defined period of time, so as to control the quantity and the timing of the feeding. Upon arriving in the exhaust-gas catalytic convertor, the expelled fuel causes a reaction of the excess oxygen stored therein so that the oxygen reservoir is at least partially emptied prior to the exhaust gas of the combustion arriving from the first combustion chamber. The quantity and the timing of the feeding of the fuel for purging the catalytic converter here are preferably allocated such that the exhaust-gas catalytic converter 130 as a result is already returned to the catalytic converter window, or in the direction of the latter, respectively, before the exhaust gas of the combustion of the first combustion chamber reaches the catalytic converter 130. As a result, a breach of the exhaust-gas catalytic converter 130 by non-converted exhaust gas is reduced or entirely avoided.

The invention claimed is:

1. A method (200) for operating an internal combustion engine (110) having at least two combustion chambers (1-6) and at least one exhaust-gas catalytic converter (130), the method comprising the following steps:
   detecting a beginning of a load operation phase (220) of the internal combustion engine (110) that adjoins a coasting phase, wherein the internal combustion engine (110) is not fed any fuel during the coasting phase, and fuel is fed during the load operation phase;
   determining (230) that combustion chamber of the at least two combustion chambers (1-6) of the internal combustion engine (110) in which an ignition of the fed fuel first takes place at the beginning of the load operation phase, as the first combustion chamber;
   selecting (240) one of the combustion chambers of the at least two combustion chambers (1-6) that is not determined as the first combustion chamber, as the purging combustion chamber, wherein an exhaust gas of the purging combustion chamber is directed into the same exhaust-gas catalytic converter (130) as an exhaust gas of the first combustion chamber; and
   feeding (250) a first fuel quantity into the purging combustion chamber such that the first fuel quantity, prior to igniting the fuel in the purging combustion chamber, is expelled so as to be partially or fully non-combusted in the direction of the exhaust-gas catalytic converter (130).

2. The method (200) according to claim 1, wherein the feeding (250) of the first fuel quantity into the purging combustion chamber is carried out in an expelling stroke of the purging combustion chamber.

3. The method (200) according to claim 1, wherein the first fuel quantity is chosen (240) such that the mixture expelled from the purging combustion chamber is composed so as to be sub stoichiometric to superstoichiometric.

4. The method (200) according to claim 1, wherein the first fuel quantity is determined (240) as a function of a duration of the coasting phase.

5. The method (200) according to claim 1, wherein the purging combustion chamber is selected (240) such that the non-combusted fuel makes its way into the exhaust-gas catalytic convertor (130) before an exhaust gas of the fuel ignited in the first combustion chamber.

6. The method (200) according to claim 1, wherein that combustion chamber that in the first firing order after the beginning of the load operation phase is to be ignited as the last is selected as the purging combustion chamber.

7. The method (200) according to claim 1, further comprising generating an exhaust gas in the first combustion chamber at the beginning of the load operation phase, said exhaust gas having a lambda value in the range between 0.90 and 1.

8. A computer unit (140) configured to operate an internal combustion engine (110) having at least two combustion chambers (1-6) and at least one exhaust-gas catalytic converter (130), by:
   detecting a beginning of a load operation phase (220) of the internal combustion engine (110) that adjoins a coasting phase, wherein the internal combustion engine (110) is not fed any fuel during the coasting phase, and fuel is fed during the load operation phase;
   determining (230) that combustion chamber of the at least two combustion chambers (1-6) of the internal combustion engine (110) in which an ignition of the fed fuel first takes place at the beginning of the load operation phase, as the first combustion chamber;
   selecting (240) one of the combustion chambers of the at least two combustion chambers (1-6) that is not determined as the first combustion chamber, as the purging combustion chamber, wherein an exhaust gas of the purging combustion chamber is directed into the same exhaust-gas catalytic converter (130) as an exhaust gas of the first combustion chamber; and
   feeding (250) a first fuel quantity into the purging combustion chamber such that the first fuel quantity, prior to igniting the fuel in the purging combustion chamber, is expelled so as to be partially or fully non-combusted in the direction of the exhaust-gas catalytic converter (130).

9. A non-transitory, computer-readable storage medium containing instructions that when executed by a computer cause the computer to operate an internal combustion engine (110) having at least two combustion chambers (1-6) and at least one exhaust-gas catalytic converter (130), by:
   detecting a beginning of a load operation phase (220) of the internal combustion engine (110) that adjoins a coasting phase, wherein the internal combustion engine (110) is not fed any fuel during the coasting phase, and fuel is fed during the load operation phase;
   determining (230) that combustion chamber of the at least two combustion chambers (1-6) of the internal combustion engine (110) in which an ignition of the fed fuel first takes place at the beginning of the load operation phase, as the first combustion chamber;
   selecting (240) one of the combustion chambers of the at least two combustion chambers (1-6) that is not determined as the first combustion chamber, as the purging combustion chamber, wherein an exhaust gas of the purging combustion chamber is directed into the same exhaust-gas catalytic converter (130) as an exhaust gas of the first combustion chamber; and
   feeding (250) a first fuel quantity into the purging combustion chamber such that the first fuel quantity, prior to igniting the fuel in the purging combustion chamber, is expelled so as to be partially or fully non-combusted in the direction of the exhaust-gas catalytic converter (130).

* * * * *